United States Patent
Shinmura et al.

(10) Patent No.: US 6,597,975 B1
(45) Date of Patent: Jul. 22, 2003

(54) VEHICLE CO-OPERATIVE CONTROL SYSTEM

(75) Inventors: Tomoyuki Shinmura, Wako (JP); Hiromi Inagaki, Wako (JP); Masakatsu Hori, Wako (JP); Tatsuhiro Tomari, Wako (JP); Shinji Ohkuma, Wako (JP); Akihiro Iwazaki, Wako (JP); Yasuji Shibahata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,623

(22) Filed: Mar. 8, 2000

(30) Foreign Application Priority Data

Mar. 10, 1999 (JP) ............................................. 11-063113
Mar. 12, 1999 (JP) ............................................. 11-065977

(51) Int. Cl.$^7$ .............................. B62D 6/00; H02P 3/18
(52) U.S. Cl. ........................... 701/48; 701/43; 318/430
(58) Field of Search ............................... 701/41, 43, 71, 701/48, 84, 88, 89; 318/430, 432

(56) References Cited

U.S. PATENT DOCUMENTS

| | | | | |
|---|---|---|---|---|
| 5,053,966 A | * | 10/1991 | Takahashi et al. | 364/424.05 |
| 5,253,728 A | * | 10/1993 | Matsuno et al. | 180/140 |
| 5,297,646 A | * | 3/1994 | Yamamura et al. | 180/142 |
| 5,444,622 A | * | 8/1995 | Takeshima et al. | 364/424.05 |
| 5,596,252 A | * | 1/1997 | Shimizu et al. | 318/432 |
| 5,627,754 A | * | 5/1997 | Asanuma et al. | 364/424.051 |
| 5,668,721 A | * | 9/1997 | Chandy | 701/41 |
| 5,742,917 A | * | 4/1998 | Matsuno | 701/69 |
| 5,828,973 A | * | 10/1998 | Takeuchi et al. | 701/41 |
| 5,894,205 A | * | 4/1999 | Shimizu et al. | 318/432 |
| 5,931,244 A | * | 8/1999 | Renfroe et al. | 180/6.32 |
| 5,982,137 A | * | 11/1999 | Endo | 318/812 |
| 5,992,557 A | * | 11/1999 | Nakamura et al. | 180/446 |
| 6,009,364 A | * | 12/1999 | Wada et al. | 701/43 |
| 6,013,994 A | * | 1/2000 | Endo et al. | 318/432 |
| 6,131,693 A | * | 10/2000 | Mukai et al. | 180/446 |
| 6,154,696 A | * | 11/2000 | Nishi et al. | 701/41 |

FOREIGN PATENT DOCUMENTS

| | | | |
|---|---|---|---|
| JP | 5-262250 A | * | 10/1993 |
| JP | 5-262250 | | 12/1993 |
| JP | 11-129927 | | 5/1999 |

* cited by examiner

Primary Examiner—Tan Q. Nguyen
Assistant Examiner—Dalena Tran
(74) Attorney, Agent, or Firm—Arent Fox Kintner Plotkin & Kahn, PLLC

(57) ABSTRACT

A vehicle co-operative control system is provided which suppresses the torque steer phenomenon by co-operatively controlling a driving force and/or braking force distribution device and an electric power steering device without changing the control device of the electric power steering device for a vehicle having a specification in which the co-operative control is not carried out or with the introduction of only a minimal change. The control device can also be applied to a vehicle having a specification in which the co-operative control is carried out. In order to achieve this, the steering torque detected by the steering torque detecting device is input into a corrected steering torque calculating device of a first electronic control unit for controlling the driving force and/or braking force distribution device and a corrected steering torque which has been calculated in the corrected steering torque calculating device is input into the second electronic control unit for controlling the electric power steering device. The second electronic control unit controls the electric power steering device based on the corrected steering torque and thus the torque steer phenomenon caused by the driving force and/or braking force distribution device is suppressed.

9 Claims, 15 Drawing Sheets

VEHICLE CO-OPERATIVE CONTROL SYSTEM

BACKGROUND OF THE INVENTION

1. Field of the Invention

The present invention relates to vehicle co-operative control systems comprising a combination of a driving force and/or braking force distribution device which distributes the driving force or braking force between the right and left wheels or between the front and rear wheels and an electric power steering device which applies a steering assist torque to the steering system.

2. Description of the Prior Art

There is a known technique for enhancing the turning performance of a vehicle where the ratio by which the engine driving force is distributed between the right and left driven wheels is made variable, and the driving force distributed to the outer turning wheel is increased while the driving force distributed to the inner turning wheel is decreased so as to generate a yaw moment in the turning direction. In a vehicle having such a driving force distribution device, there is the problem that when the driving forces distributed to the right and left driven wheels are varied, an undesirable steering force is produced in the right and left driven wheels which also serve as steering wheels (the torque steer phenomenon). Therefore, the present assignee has already made a proposal in which the torque steer phenomenon is suppressed by utilizing an electric power steering device which is provided in the vehicle and generating a steering assist torque in the electric power steering device so as to counteract the above-mentioned undesirable steering force (ref. Japanese Patent Application Laid-open No. 11-129927).

In the above-mentioned prior art system, a circuit for generating a steering assist torque which suppresses the torque steer phenomenon is incorporated beforehand into the control means for controlling the electric power steering device. On the other hand, in the case of vehicles having a specification in which a driving force distribution device is not provided, it is unnecessary to incorporate a circuit for generating a steering assist torque which suppresses the torque steer phenomenon, into the control means for controlling the electric power steering device, and therefore it is necessary to change the design of the above-mentioned control means according to whether or not the specification of the vehicle includes a driving force distribution device, thus resulting in a high cost.

SUMMARY OF THE INVENTION

The present invention has been carried out in view of the above-mentioned circumstances, and it is an objective of the present invention to provide a vehicle co-operative control system for suppressing the torque steer phenomenon by co-operatively controlling a driving force and/or braking force distribution device and an electric power steering device, wherein without changing the control means of the electric power steering device of a vehicle having a specification in which the co-operative control is not carried out or with the addition of only a minimal change, the control means can be applied to a vehicle having a specification in which the co-operative control is carried out.

In order to achieve the above-mentioned objective, this first characteristic of the present invention is a vehicle co-operative control device comprising a driving force and/or braking force distribution device for distributing the driving force or braking force between the right and left wheels or between the front and rear wheels, a first control means for controlling the operation of the driving force and/or braking force distribution device, an electric power steering device for applying a steering assist torque to a steering system, and a second control means for controlling the operation of the electric power steering device based on at least the steering torque detected by a steering torque detecting means. The steering torque detected by the steering torque detecting means is input into the first control means and the first control means calculates a corrected steering torque by correcting the steering torque according to the degree of control of the driving force and/or braking force distribution device and outputs it to the second control means. The second control means calculates the steering assist torque based on the corrected steering torque.

In accordance with the above arrangement, the steering torque detected by the steering torque detecting means is not directly input into the second control means of the electric power steering device; instead the steering torque is input into the first control means of the driving force and/or braking force distribution device and is corrected according to the degree of control of the driving force and/or braking force distribution device. The corrected steering torque is input into the second control means so as to calculate the steering assist torque of the electric power steering device and, therefore, the second control means of a vehicle in which co-operative control between the electric power steering device and the driving force and/or braking force distribution device is not carried out, can be used without modification so as to effect the co-operative control thus contributing to a reduction in cost.

A second characteristic of the present invention is a vehicle co-operative control device comprising a driving force and/or braking force distribution device for distributing the driving force or braking force between the right and left wheels or between the front and rear wheels, a first control means for controlling the operation of the driving force and/or braking force distribution device, an electric power steering device for applying a steering assist torque to a steering system, and a second control means for controlling the operation of the electric power steering device based on at least the steering torque detected by a steering torque detecting means. The first control means calculates an amount of steering torque correction according to the degree of control of the driving force and/or braking force distribution device and outputs it to the second control means, and the second control means calculates the steering assist torque based on a value obtained by adding or subtracting the amount of steering torque correction to or from the steering torque detected by the steering torque detecting means.

In accordance with the above arrangement, the first control means of the driving force and/or braking force distribution device calculates an amount of steering torque correction according to the degree of control of the driving force and/or braking force distribution device. The second control means into which the amount of steering torque correction has been input, calculates a steering assist torque for the electric power steering device based on the value obtained by adding or subtracting the amount of steering torque correction to or from the steering torque detected by the steering torque detecting means. Therefore the co-operative control can be carried out while minimizing changes made to the second control means of a vehicle which does not carry out co-operative control between the electric power steering device and the driving force and/or braking force distribution device, thus contributing to a reduction in cost.

A third characteristic of the present invention is a vehicle co-operative control device comprising a driving force and/or braking force distribution device for distributing the driving force or braking force between the right and left wheels or between the front and rear wheels, a first control means for controlling the operation of the driving force and/or braking force distribution device, an electric power steering device having a motor for applying steering assist torque to the steering system, and a second control means for calculating a steering assist control signal for driving the motor based on at least the steering torque detected by a steering torque detecting means. The first control means can calculate a torque steer prevention control signal for driving the motor based on the degree of control of the driving force and/or braking force distribution device, and the second control means comprises a switch over means which provides an output to the electric power steering device by selecting either one of the steering assist control signal and the torque steer prevention control signal according to the operational status of the driving force and/or braking force distribution device.

In accordance with the above arrangement, when the driving force and/or braking force distribution device has a non-operational status, control of the motor of the electric power steering device is based on the steering assist control signal calculated by the second control means. When the driving force and/or braking force distribution device has an operational status, the switch over means provided on the second control means is switched over so that the drive of the motor of the electric power steering device is based on the torque steer prevention control signal calculated by the first control means. Therefore by carrying out only the minimal change of adding a switch over means to the second control means of a vehicle which does not carry out co-operative control between the electric power steering device and the driving force and/or braking force distribution device the co-operative control can be effected, thus contributing to a reduction in cost.

In addition to the third characteristic, a fourth characteristic of the present invention proposes a vehicle co-operative control device in which the switch over means gradually carries out the switch over between a steering assist control signal and a torque steer prevention control signal.

In accordance with the above arrangement, since the switch over between the steering assist control signal and the torque steer prevention control signal is carried out gradually, rapid changes to the steering assist torque added to the steering system which cause the driver to experience an unpleasant sensation can be prevented.

A fifth characteristic of the present invention is a vehicle co-operative control device comprising a driving force and/or braking force distribution device for distributing the driving force or braking force between the right and left wheels or between the front and rear wheels, a first control means for controlling the operation of the driving force and/or braking force distribution device, an electric power steering device having a motor for applying steering assist torque to a steering system, and a second control means for calculating a motor control signal for driving the motor based on at least the steering torque detected by a steering torque detecting means. The first control means can calculate a correction signal for correcting the motor control signal based on the degree of control of the driving force and/or braking force distribution device, and the second control means comprises an addition and subtraction means which adds or subtracts the correction signal to or from the motor control signal.

In accordance with the above arrangement, the first control means for controlling the driving force and/or braking force distribution device calculates a correction signal according to the degree of control of the driving force and/or braking force distribution device, and the second control means for controlling the electric power steering device, drives the motor by adding or subtracting the amount of the correction signal to or from the motor control signal. Therefore the co-operative control is enabled by carrying out only the minimal change of introducing an addition and subtraction means to the second control means of a vehicle which does not carry out co-operative control between the electric power steering device and the driving force and/or braking force distribution device, thus contributing to a reduction in cost.

The above-mentioned objectives, other objectives, characteristics and advantages of the present invention will become apparent from an explanation of preferable embodiments which will be described in detail below by reference to the attached drawings.

BRIEF DESCRIPTION OF THE DRAWINGS

FIG. 1 is a diagram showing the structure of the driving force distribution device.

FIG. 2 is a block diagram showing the configuration of the circuit of the first electronic control unit.

FIG. 3 is a diagram showing the action of the driving force distribution device when the vehicle is turning right at a medium to low speed.

FIG. 4 is a diagram showing the action of the driving force distribution device when the vehicle is turning left at a medium to low speed.

FIG. 5 is a diagram showing the structure of the electric power steering device.

FIG. 6 is a block diagram showing the configuration of the circuit of the second electronic control unit.

FIG. 7 is a graph showing the relationship between the steering torque and the absolute value of the difference between the torque distributions.

FIG. 8 is a map that is used for searching for the amount of steering torque correction from the absolute value of the difference between the torque distributions.

FIG. 10 is a block diagram showing the configuration of the circuit of the first electronic control unit.

FIG. 11 is a diagram showing the structure of the electric power steering device.

FIG. 12 is a block diagram showing the configuration of the circuit of the second electronic control unit.

FIG. 13 is a map that is used for searching for the target steering torque from the lateral acceleration and speed.

DETAILED DESCRIPTION OF A PREFERRED EMBODIMENT

A first embodiment of the present invention is explained below by reference to FIG. 1 to FIG. 8.

Figure 1:
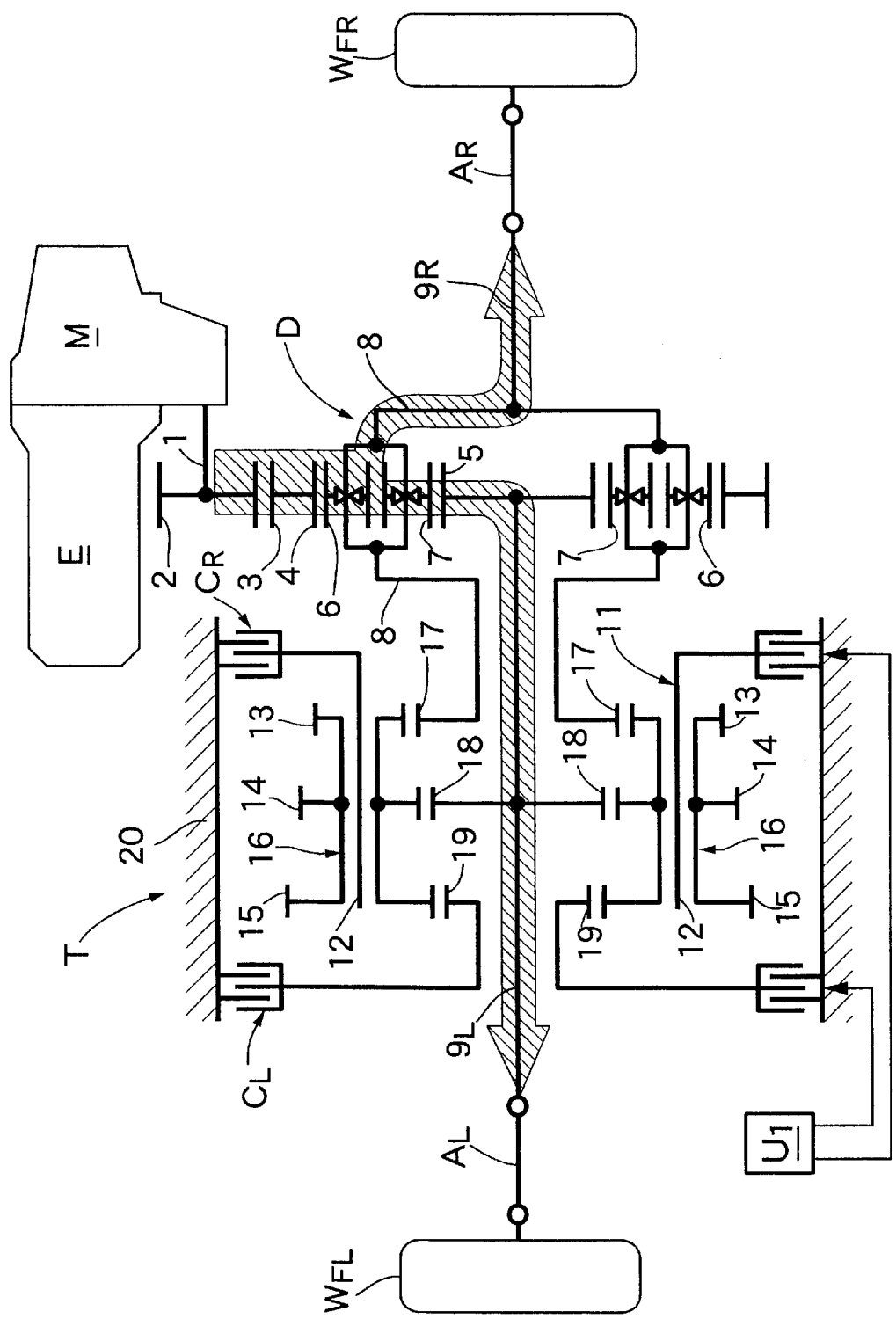
FIGS. 1 to 8 illustrate a first embodiment of the present invention.

As shown in FIG. 1, a transmission M is connected to the right end of an engine E which is laterally mounted in the front part of the vehicle body of a front-engine and front-wheel drive vehicle, and a driving force distribution device T is placed to the rear of engine E and transmission M. A front right wheel $W_{FR}$ and a front left wheel $W_{FL}$ are connected to a right drive shaft $A_R$ and a left drive shaft $A_L$ respectively which extend laterally from the right end and the left end of the driving force distribution device T. The driving force distribution device T forms the driving force and/or braking force distribution device of the present invention.

The driving force distribution device T comprises a differential D to which the driving force is transmitted from an outer toothed gear 3 meshing with an input gear 2 provided on an input shaft 1 extending from the transmission M. The differential D employs a double pinion type planetary gear mechanism and comprises a ring gear 4 which is integrally formed with the outer toothed gear 3, a sun gear 5 which is provided coaxially inside the ring gear 4, and a planetary carrier 8 which supports an outer planetary gear 6 meshing with the ring gear 4 and an inner planetary gear 7 meshing with the sun gear 5 in a state in which they are meshed with each other. In the differential D the ring gear 4 functions as an input element while the sun gear 5 which functions as one of the output elements is connected to the front left wheel $W_{FL}$ via a left output shaft $9_L$ and the planetary carrier 8 which functions as the other of the output elements is connected to the front right wheel $W_{FR}$ via a right output shaft $9_R$.

A carrier member 11 which is supported on the outer circumference of the left output shaft $9_L$ in a rotatable manner comprises four pinion shafts 12 provided in the circumferential direction at 90° intervals, and each pinion shaft 12 supports in a rotatable manner, a triad pinion member 16 in which a first pinion 13, a second pinion 14 and a third pinion 15 are integrally formed.

A first sun gear 17 meshing with the first pinion 13, which is supported in rotatable manner on the outer circumference of the left output shaft $9_L$, is linked to the planetary carrier 8 of the differential D. A second sun gear 18 which is fixed on the outer circumference of the left output shaft $9_L$ meshes with the second pinion 14. Furthermore, a third sun gear 19 which is supported in a rotatable manner on the outer circumference of the left output shaft $9_L$ meshes with the third pinion 15.

The numbers of teeth of the first pinion 13, the second pinion 14, the third pinion 15, the first sun gear 17, the second sun gear 18 and the third sun gear 19 in the embodiment are as follows.

| | |
|---|---|
| Number of teeth of the first pinion 13 | $Z_2 = 17$ |
| Number of teeth of the second pinion 14 | $Z_4 = 17$ |
| Number of teeth of the third pinion 15 | $Z_6 = 34$ |
| Number of teeth of the first sun gear 17 | $Z_1 = 32$ |

-continued

| | |
|---|---|
| Number of teeth of the second sun gear 18 | $Z_3 = 28$ |
| Number of teeth of the third sun gear 19 | $Z_5 = 32$ |

The third sun gear 19 can be connected to a casing 20 via a left hydraulic clutch $C_L$, and the rotation rate of a carrier member 11 is increased by engagement of the left hydraulic clutch $C_L$. The carrier member 11 can be connected to the casing 20 via a right hydraulic clutch $C_R$, and the rotation rate of the carrier member 11 is reduced by engagement of the right hydraulic clutch $C_R$. The right hydraulic clutch $C_R$ and left hydraulic clutch $C_L$ are controlled by a first electronic control unit $U_1$ containing a microcomputer. The first electronic control unit $U_1$ forms the first control means of the present invention.

Figure 2:
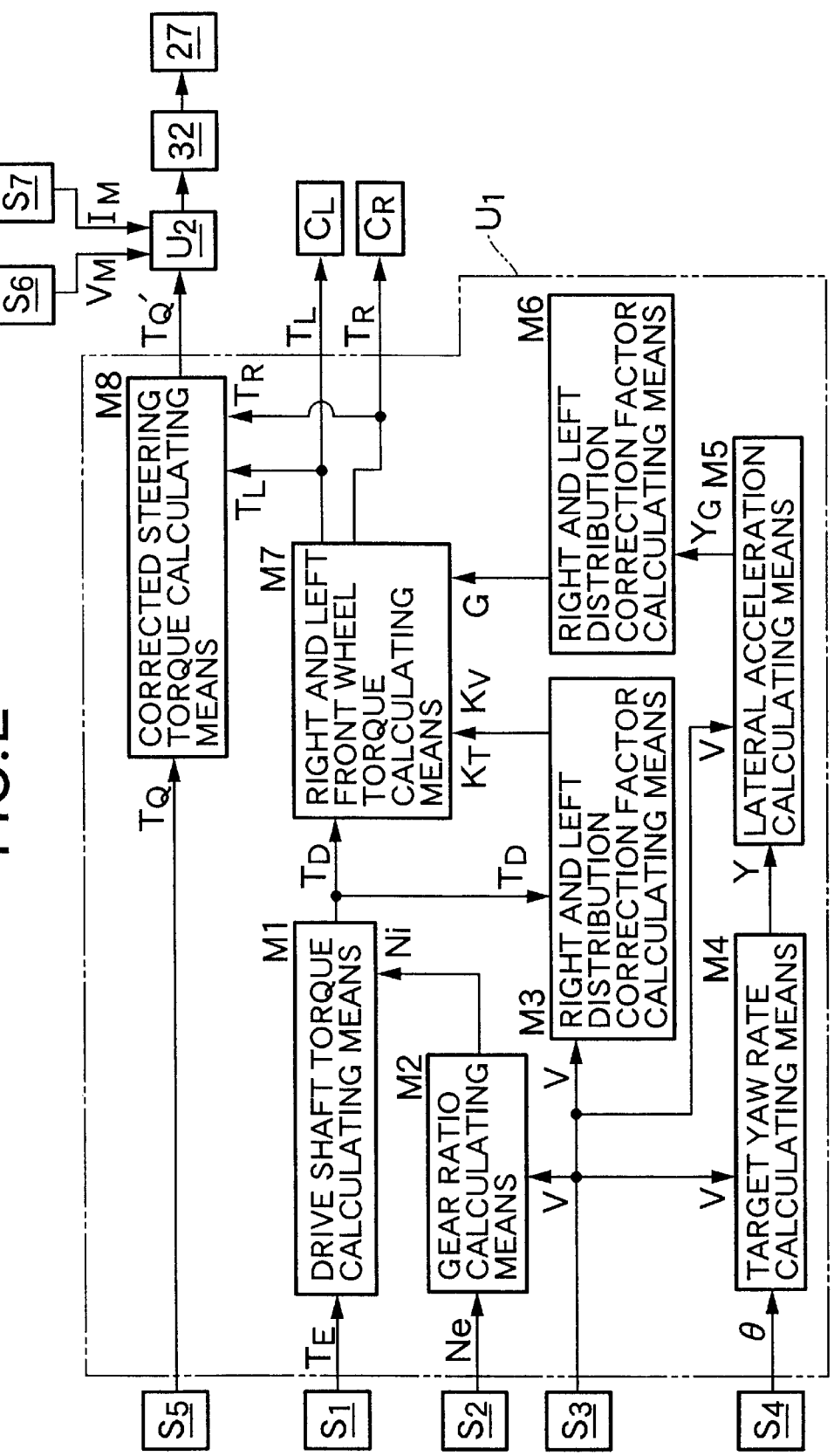

As shown in FIG. 2, signals from an engine torque detecting means $S_1$ for detecting the engine torque $T_E$, an engine rotation rate detecting means $S_2$ for detecting the rotation rate Ne of the engine E, a vehicle speed detecting means $S_3$ for detecting the vehicle speed V, a steering angle detecting means $S_4$ for detecting the steering angle θ and a steering torque detecting means $S_5$ for detecting the steering torque $T_Q$ are input into the first electronic control unit $U_1$. The first electronic control unit $U_1$ processes the signals from the detecting means $S_1$ to $S_5$ based on a predetermined program, thus controlling the left hydraulic clutch $C_L$ and right hydraulic clutch $C_R$.

The first electronic control unit $U_1$ comprises a drive shaft torque calculating means M1, a gear ratio calculating means M2, a right and left distribution correction factor calculating means M3, a target yaw rate calculating means M4, a lateral acceleration calculating means M5, a right and left distribution correction factor calculating means M6, a front right and left wheel torque calculating means M7 and a corrected steering torque calculating means M8.

The drive shaft torque calculating means M1 calculates the drive shaft torque $T_D$ (the total torque transmitted to the front right and left wheels $W_{FR}$, $W_{FL}$) by multiplying the engine torque $T_E$ by the gear ratio Ni produced by the gear ratio calculating means M2 from the engine rotation rate Ne and the vehicle speed V. In addition, the engine torque $T_E$ can be obtained from the intake pressure (or opening of the accelerator) and the engine rotation rate Ne, and the drive shaft torque $T_D$ can also be obtained by means other than that mentioned above such as a torque detecting means provided on the power transmission system or the longitudinal acceleration of the vehicle. Furthermore, the vehicle speed V may be determined by means other than the wheel speed such as by an optical means using a space filter, or it may be determined using a Doppler radar.

The right and left distribution correction factor calculating means M3 carries out a map search for a first right and left distribution correction factor $K_T$ based on the drive shaft torque $T_D$ as well as for a second right and left distribution correction factor $K_V$ based on the vehicle speed V. The target yaw rate calculating means M4 carries out a map search for the steering angle component $Y_1$ of the target yaw rate Y based on the steering angle θ as well as for the vehicle speed component $Y_2$ of the target yaw rate Y based on the vehicle speed V, and calculates the target yaw rate Y by multiplying the steering angle component $Y_1$ and the vehicle speed component $Y_2$. The lateral acceleration calculating means M5 calculates the lateral acceleration $Y_G$ by multiplying the target yaw rate Y by the vehicle speed V, and the right and left distribution correction factor calculating means M6 carries out a map search for the right and left distribution correction factor G based on the lateral acceleration $Y_G$.

Finally, the front right and left wheel torque calculating means M7 calculates a torque distribution $T_L$ that is to be distributed to the front left wheel $W_{FL}$ and a torque distribution $T_R$ that is to be distributed to the front right wheel $W_{FR}$ based on the equations below.

$$T_L = (T_D/2) \times (1 + K_W \times K_T \times K_V \times G) \quad (1)$$

$$T_R = (T_D/2) \times (1 - K_W \times K_T \times K_V \times G) \quad (2)$$

Here, $K_V$ and $K_T$ denote the right and left distribution correction factors determined by the right and left distribution correction factor calculating means M3, G denotes the right and left distribution correction factor determined by the right and left distribution correction factor calculating means M6, and $K_W$ is a constant.

The terms $(1 \pm K_W \times K_T \times K_V \times G)$ on the right hand side of equation (1) and equation (2) determine the torque distribution ratio between the front right and left wheels $W_{FR}$, $W_{FL}$, and when the torque distribution to one of the front right and left wheels $W_{FR}$, $W_{FL}$ increases by a predetermined amount, the torque distribution to the other of the front right and left wheels $W_{FR}$, $W_{FL}$ decreases by the predetermined amount.

When the torque distributions $T_R$, $T_L$ that are to be distributed to the front right and left wheels $W_{FR}$, $W_{FL}$ are determined as the right hydraulic clutch $C_R$ and left hydraulic clutch $C_L$ are controlled so that the torque distributions $T_R$, $T_L$ are transmitted to the front right and left wheels $W_{FR}$, $W_{FL}$.

The corrected steering torque calculating means M8 will be described in detail below.

In accordance with a command from the first electronic control unit $U_1$, both the right hydraulic clutch $C_R$ and the left hydraulic clutch $C_L$ are in a disengaged state while the vehicle is traveling straight ahead. Thus, the carrier member 11 and the third sun gear 19 are not restrained, and the left drive shaft $9_L$, the right drive shaft $9_R$, the planetary carrier 8 of the differential D and the carrier member 11 all rotate in unison. At this time the torque of the engine E is transmitted equally to the front right and left wheels $W_{FR}$, $W_{FL}$ from the differential D as shown by the hatched arrow in FIG. 1.

Figure 3:
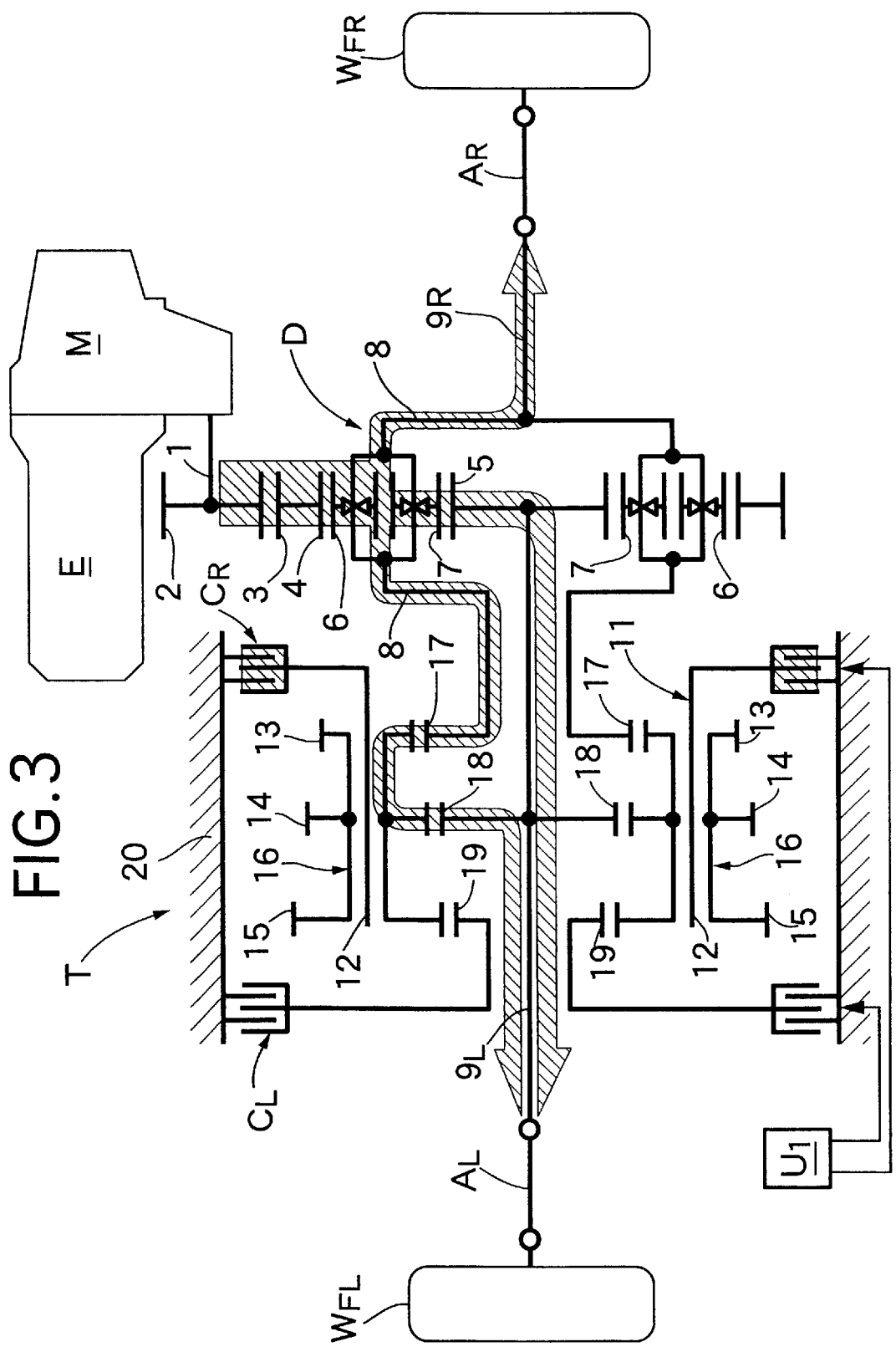

When the vehicle is turning right at a medium to low speed, as shown in FIG. 3 the right hydraulic clutch $C_R$ is engaged in accordance with a command from the first electronic control unit $U_1$ so as to stop the carrier member 11 by connecting it to the casing 20. At this time, since the left output shaft $9_L$ which is integrated with the front left wheel $W_{FL}$ and the right output shaft $9_R$ which is integrated with the front right wheel $W_{FR}$ (the planetary carrier 8 of the differential D) are linked via the second sun gear 18, the second pinion 14, the first pinion 13 and the first sun gear 17, the rotation rate $N_L$ of the front left wheel $W_{FL}$ is increased relative to the rotation rate $N_R$ of the front right wheel $W_{FR}$ according to the relationship shown in the equation below.

$$N_L / N_R = (Z_4/Z_3) \times (Z_1/Z_2) = 1.143 \quad (3)$$

When the rotation rate $N_L$ of the front left wheel $W_{FL}$ is increased relative to the rotation rate $N_R$ of the front right wheel $W_{FR}$, a portion of the torque of the front right wheel $W_{FR}$ which is the inner turning wheel, can be transmitted to the front left wheel $W_{FL}$ which is the outer turning wheel, as shown by the hatched arrow in FIG. 3.

Instead of stopping the carrier member 11 by means of the right hydraulic clutch $C_R$, if the rotation rate of the carrier member 11 is reduced by appropriately adjusting the engagement force of the right hydraulic clutch $C_R$, according to the deceleration, the rotation rate $N_L$ of the front left wheel $W_{FL}$ can be increased relative to the rotation rate $N_R$ of the front right wheel $W_{FR}$, and the required level of torque can be transmitted from the front right wheel $W_{FR}$ which is the inner turning wheel to the front left wheel $W_{FL}$ which is the outer turning wheel.

Figure 4:
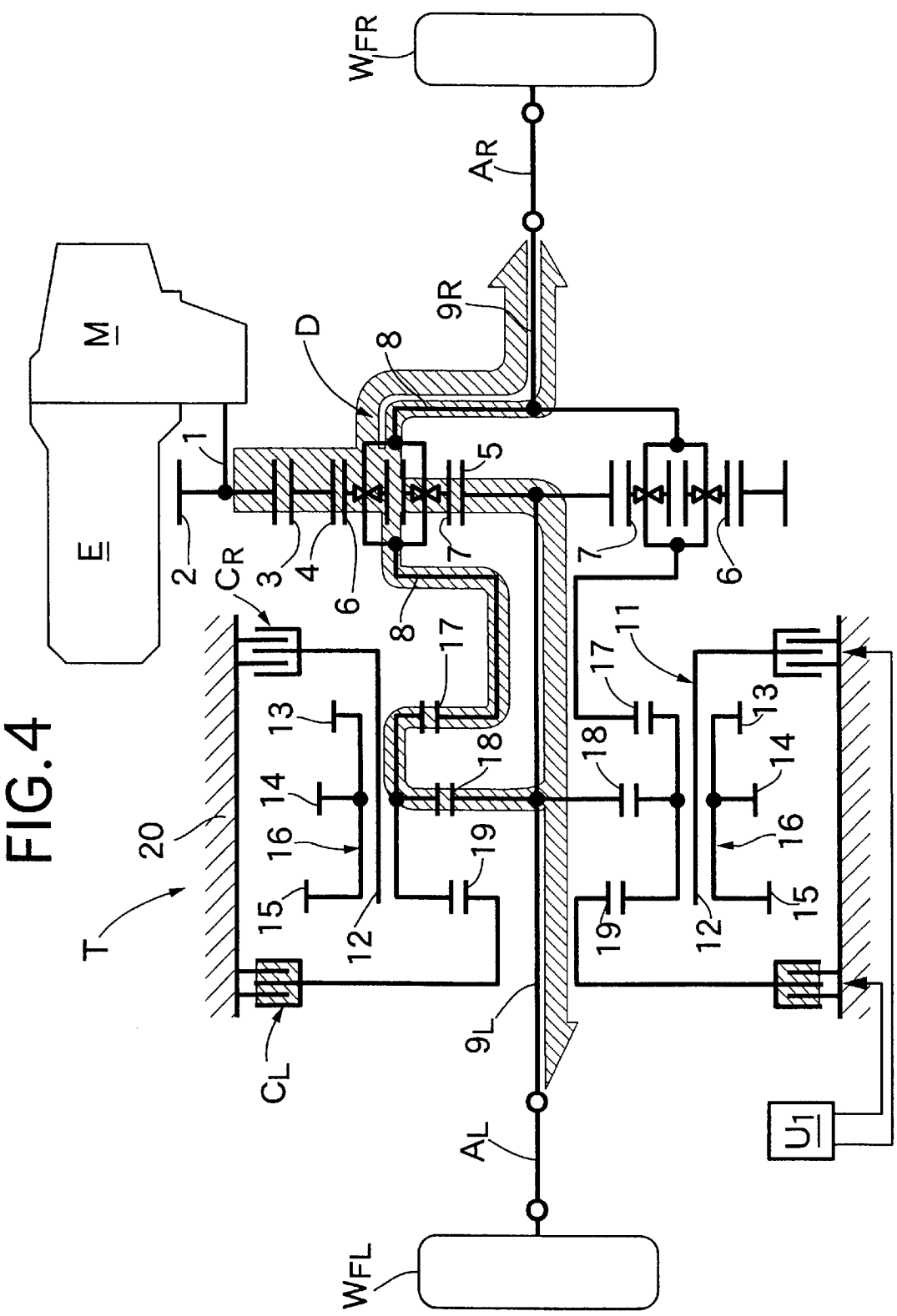

On the other hand, when the vehicle is turning left at a medium to low speed, as shown in FIG. 4 the left hydraulic clutch $C_L$ is engaged in accordance with a command from the first electronic control unit $U_1$ and the third pinion 15 is connected to the casing 20 via the third sun gear 19. As a result, the rotation rate of the carrier member 11 increases relative to the rotation rate of the left output shaft $9_L$, and the rotation rate $N_R$ of the front right wheel $W_{FR}$ is increased relative to the rotation rate $N_L$ of the front left wheel $W_{FL}$ in accordance with the relationship shown in the equation below.

$$N_R / N_L = \{1 - (Z_5/Z_6) \times (Z_2/Z_1)\} / \{1 - (Z_5/Z_6) \times (Z_4/Z_3)\} \quad (4)$$

$$= 1.167$$

As above-mentioned, when the rotation rate $N_R$ of the front right wheel $W_{FR}$ increases relative to the rotation rate $N_L$ of the front left wheel $W_{FL}$, a portion of the torque of the front left wheel $W_{FL}$ which is the inner turning wheel can be transmitted to the front right wheel $W_{FR}$ which is the outer turning wheel as shown by the hatched arrow in FIG. 4. Also in this case, if the rotation rate of the carrier member 11 is increased by appropriately adjusting the engagement force of the left hydraulic clutch $C_L$, according to the acceleration, the rotation rate $N_R$ of the front right wheel $W_{FR}$ can be increased relative to the rotation rate $N_L$ of the front left wheel $W_{FL}$, and the required level of torque can be transmitted from the front left wheel $W_{FL}$ which is the inner turning wheel, to the front right wheel $W_{FR}$, which is the outer turning wheel. Thus, it is possible to enhance the turning performance by transmitting a larger torque to the outer turning wheel than that to the inner turning wheel at a time when the vehicle is traveling at a medium to low speed. In addition, when a vehicle is traveling at a high speed it is possible to enhance the stability of travel by lessening the torque transmitted to the outer turning wheel in comparison with the case of a medium to low speed or alternatively by transmitting torque from the outer turning wheel to the inner turning wheel. This can be achieved in the right and left distribution correction factor calculating means M3 of the first electronic control unit $U_1$ by setting the map of the second right and left distribution correction factor $K_V$ relative to vehicle speed V.

As is clear from a comparison of equation (3) with equation (4), since the number of teeth of the first pinion 13, the second pinion 14, the third pinion 15, the first sun gear 17, the second sun gear 18 and the third sun gear 19 are set as above-mentioned, the percentage increase in speed (about 1.143) of the front left wheel $W_{FL}$ over the front right wheel $W_{FR}$ can be made almost equal to the percentage increase in speed (about 1.167) of the front right wheel $W_{FR}$ over the front left wheel $W_{FL}$.

Figure 5:
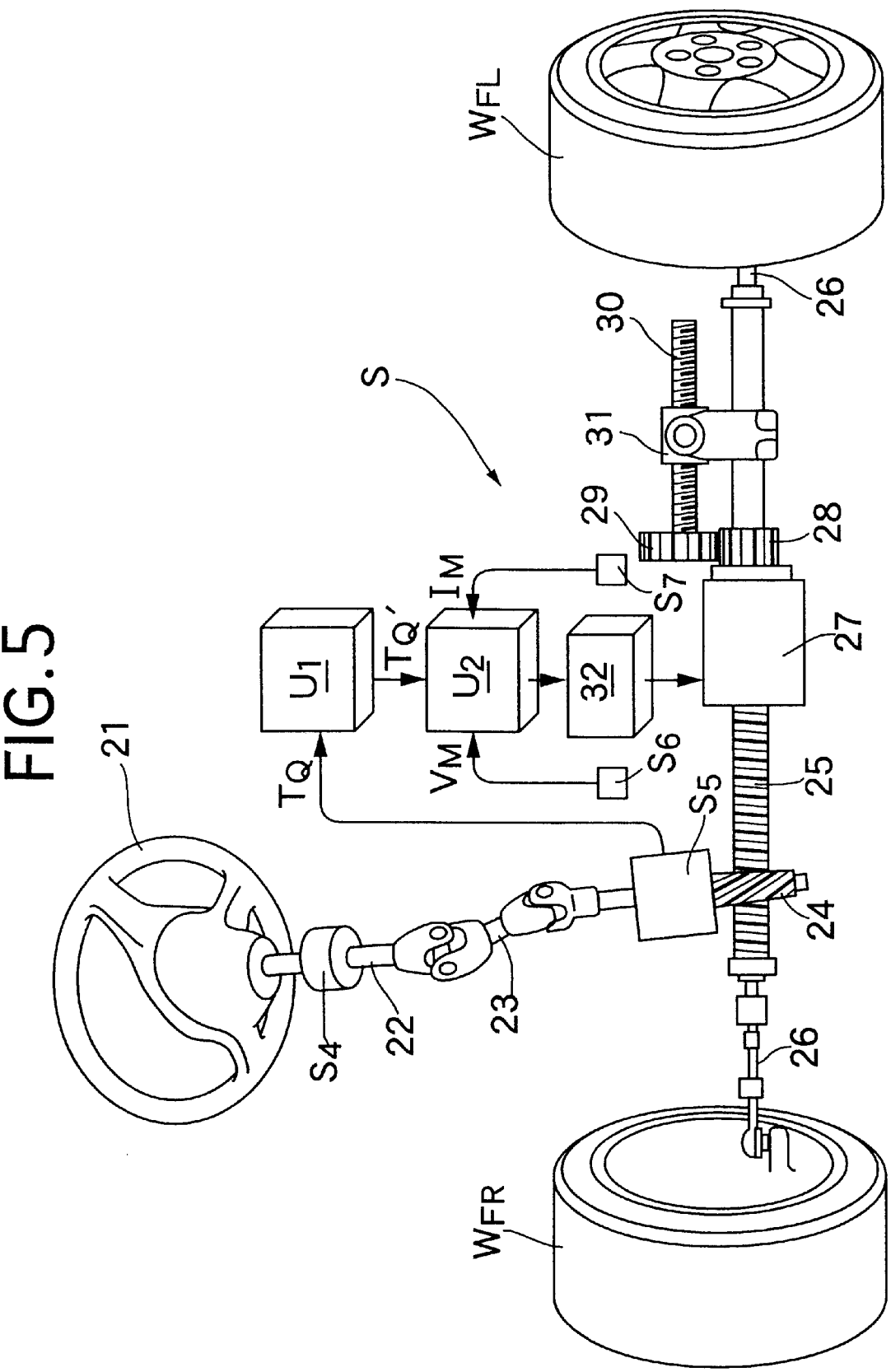

Next, an explanation of a vehicle steering system is given based on FIG. 5.

A steering torque which is input into a steering wheel 21 by a driver is transmitted to a rack 25 via a steering shaft 22, a connecting shaft 23 and a pinion 24, and the reciprocating motion of the rack 25 is further transmitted to the front right and left wheels $W_{FR}$, $W_{FL}$ via right and left tie rods 26, 26 so as to turn the front wheels $W_{FR}$, $W_{FL}$. An electric power steering device S provided in the steering system, comprises a drive gear 28 provided on an output shaft of a motor 27, a driven gear 29 meshing with the drive gear 28, a screw shaft 30 which is integral with the driven gear 29, and a nut 31 which meshes with the screw shaft 30 and is also connected to the rack 25.

A second electronic control unit $U_2$ which forms the second controlling means of the present invention does not control operation of the electric power steering device S by itself, but it co-operatively controls operation of the electric power steering device S in conjunction with the operation of the driving force distribution device T. Therefore, a steering torque $T_Q$ detected by the steering torque detecting means $S_5$ is first input into the first electronic control unit $U_1$ for controlling the driving force distribution device T and corrected, and operation of the motor 27 of the electric power steering device S is controlled by the second electronic control unit $U_2$ via a motor driver 32, into which the corrected steering torque $T_Q'$ is input. In addition to the corrected steering torque $T_Q'$, a voltage $V_M$ of the motor 27 detected by a voltage detecting means $S_6$ and a current $I_M$ of the motor 27 detected by a current detecting means $S_7$ are input into the second electronic control unit $U_2$.

Figure 6:
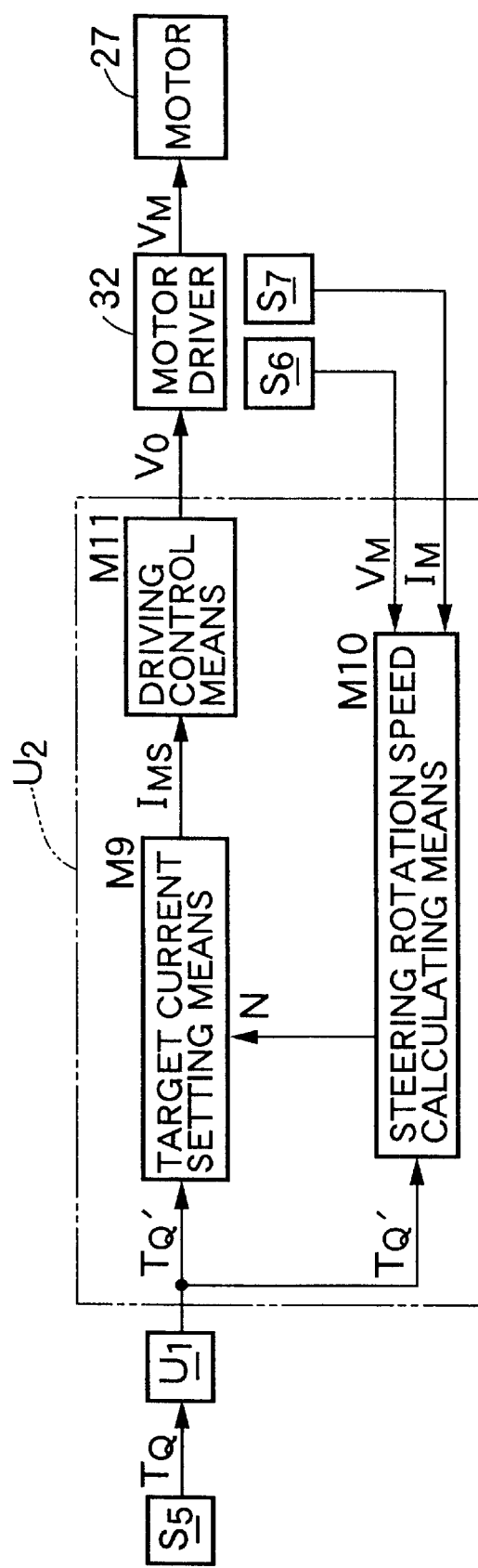

As shown in FIG. 6, the second electronic control unit $U_2$ comprises a target current setting means M9, a steering rotation speed calculating means M10 and a driving control means M11.

The target current setting means M9 calculates a target current $I_{MS}$ for driving the motor 27 based on the corrected steering torque $T_Q'$ which is input from the first electronic control unit $U_1$ and a steering rotation speed N which is input from the steering rotation speed calculating means M10. The steering rotation speed N is the rotation speed of the steering wheel 21 (that is to say, the rotation speed of the pinion 24), and although it is possible for it to be detected by a rotation speed detecting means such as a tachometer, in the present embodiment it is calculated by the steering rotation speed calculating means M10 based on the voltage $V_M$ of the motor 27 detected by the voltage detecting means $S_6$, the current $I_M$ of the motor 27 detected by the current detecting means $S_7$ and the corrected steering torque $T_Q'$ which is input from the first electronic control unit $U_1$.

The target current $I_{MS}$ increases linearly in response to an increase in the corrected steering torque $T_Q'$ when the corrected steering torque $T_Q'$ is at a predetermined level or less, but when the corrected steering torque $T_Q'$ exceeds the predetermined level, the smaller the steering rotation speed N, the more the upper limit for the target current $I_{MS}$ is suppressed. Due to the characteristic of the target current $I_{MS}$, when the driver turns the steering wheel 21 to its limit position so as to reach the end of the rack, that is to say, when the corrected steering torque $T_Q'$ becomes large and the steering rotation speed N becomes small, it is possible to prevent the motor 27 from being driven with a large target current $I_{MS}$ so as to become overloaded.

The driving control means M11 calculates the motor control voltage $V_0$ by converting the target current $I_{MS}$ calculated by the target current setting means M9 into a PWM control signal, the motor driver 32 subjects the motor drive voltage $V_M$ to PWM control based on the motor control voltage $V_0$, and thus the steering assist torque is generated by driving the motor 27 of the electric power steering device S.

Next, correction of the steering torque $T_Q$ which is carried out by the first electronic control unit $U_1$ is explained.

When changes are made in the driving forces which are distributed from the engine E to the front right and left wheels $W_{FR}$, $W_{FL}$ via the driving force distribution device T, undesirable steering forces are produced in the front right and left wheels $W_{FR}$, $W_{FL}$, which are the steered wheels, due to the torque steer phenomenon. In a vehicle containing an electric power steering device S, when the torque steer phenomenon is caused due to the operation of the driving force distribution device T, by operating the electric power steering device S so as to cancel the steering force due to the torque steer phenomenon and generate a steering assist torque in the opposite direction, the torque steer phenomenon can be suppressed.

As is clear from FIG. 2, the steering torque $T_Q$ detected by the steering torque detecting means $S_5$ and the torque distributions $T_R$, $T_L$ which are calculated by the front right and left wheel torque calculating means M7 and distributed to the front right and left wheels $W_{FR}$, $W_{FL}$, are input into the corrected steering torque calculating means M8 of the first electronic control unit $U_1$. Since the steering force generated by the torque steer phenomenon is proportional to $|T_L-T_R|$ which is the absolute value of the difference between the torque distributions $T_L$ $T_R$ distributed to the front right and left wheels $W_{FR}$, $W_{FL}$ and scrub radius R which is determined by the geometry of the steering system, the corrected steering torque calculating means M8 calculates the amount of steering torque correction $\Delta T_Q$ using the equation below.

$$\Delta T_Q = K \times |T_L - T_R| \times R \tag{5}$$

Here, K is a conversion factor. Furthermore, the corrected steering torque calculating means M8 calculates the corrected steering torque $T_Q'$ by adding or subtracting the amount of steering torque correction $\Delta T_Q$ to or from the steering torque $T_Q$ detected by the steering torque detecting means $S_5$ and outputs this corrected steering torque $T_Q'$ to the second electronic control unit $U_2$ for controlling the electric power steering device S.

In the case where, due to the operation of the driving force distribution device T, a steering force is produced in the same direction as that of the steering operation by the driver, the corrected steering torque $T_Q'$ is calculated by subtracting the amount of steering torque correction $\Delta T_Q$ from the steering torque $T_Q$. In the case where a steering force is produced in the direction opposite to the steering operation by the driver, the corrected steering torque $T_Q'$ is calculated by adding the amount of steering torque correction $\Delta T_Q$ to the steering torque $T_Q$. Thus the torque steer phenomenon accompanying operation of the driving force distribution device T can be suppressed.

Figure 7:
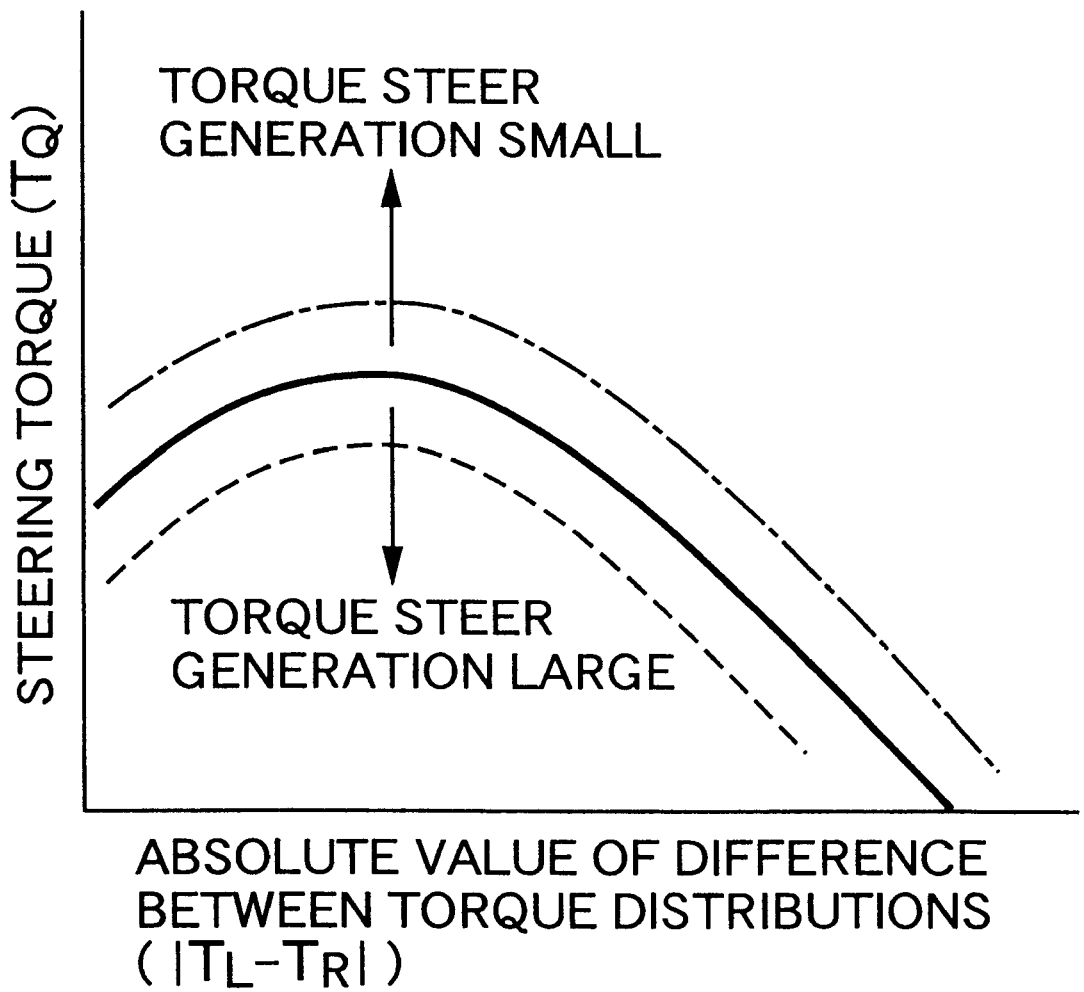
Figure 8:
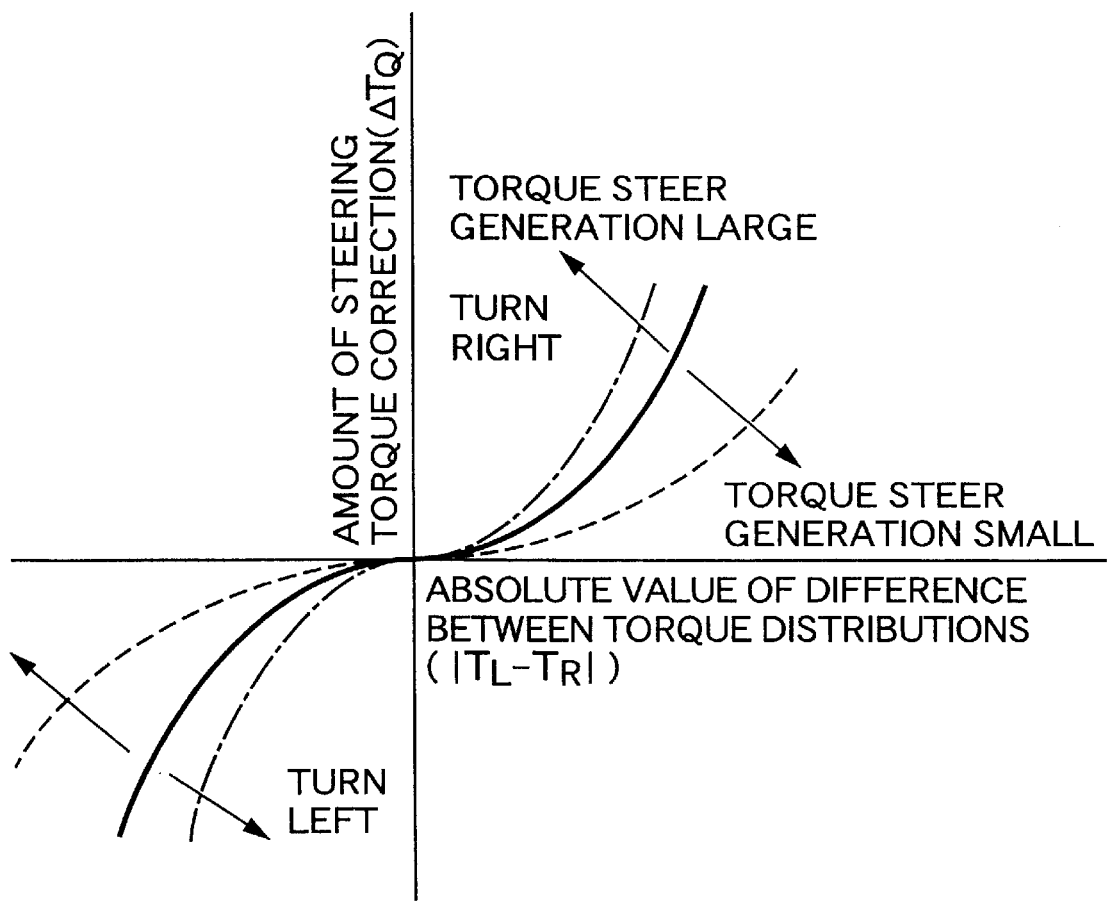

Instead of calculating the amount of steering torque correction $\Delta T_Q$ based on the equation (5), it is also possible to search for it from a map based on the steering torque $T_Q$ and the absolute value $|T_L-T_R|$ of the difference between the torque distributions. That is to say, the steering torque $T_Q$ and the absolute value $|T_L-T_R|$ of the difference between the torque distributions usually have the relationship shown by the solid line in FIG. 7, but when the amount of torque steer increases due to changes in the coefficient of friction of the road surface, etc., they have the relationship shown by the dotted broken line, and when the amount of torque steer decreases they have the relationship shown by the broken line. Therefore, by identifying which one of the three characteristic curves in FIG. 7 is the closest to the relationship between the input steering torque $T_Q$ and the absolute value $|T_L-T_R|$ of the difference between the torque distributions, choosing a characteristic curve from FIG. 8 corresponding to the identified characteristic curve in FIG. 7, and searching for the amount of steering torque correction $\Delta T_Q$ by applying the absolute value $|T_L-T_R|$ of the difference between the torque distributions to the characteristic curve, the torque steer phenomenon can be suppressed more effectively.

As hereinbefore described, the electric power steering device S is controlled by calculating the corrected steering torque $T_Q'$ by first inputting the steering torque $T_Q$ detected by the steering torque detecting means $S_5$ into the first electronic control unit $U_1$ of the driving force distribution device T and then inputting the corrected steering torque $T_Q'$ into the second electronic control unit $U_2$. Thus, the torque steer phenomenon can be suppressed merely by inputting the corrected steering torque $T_Q'$, instead of directly inputting the steering torque $T_Q$, into the second electronic control unit $U_2$ while using the conventional electronic power steering S as it is, in which the steering torque $T_Q$ detected by the steering torque detecting means $S_5$ has been directly input into the second electronic control unit $U_2$. As a result, even when installing a second electronic control unit $U_2$ of the same specification to a vehicle containing a driving force distribution device T and a vehicle not containing one, it is possible to carry out control so as to suppress the torque steer phenomenon in a vehicle containing the driving force distribution device T, thus reducing the number of variants of the second electronic control unit $U_2$ and contributing to a reduction in cost.

Figure 9:
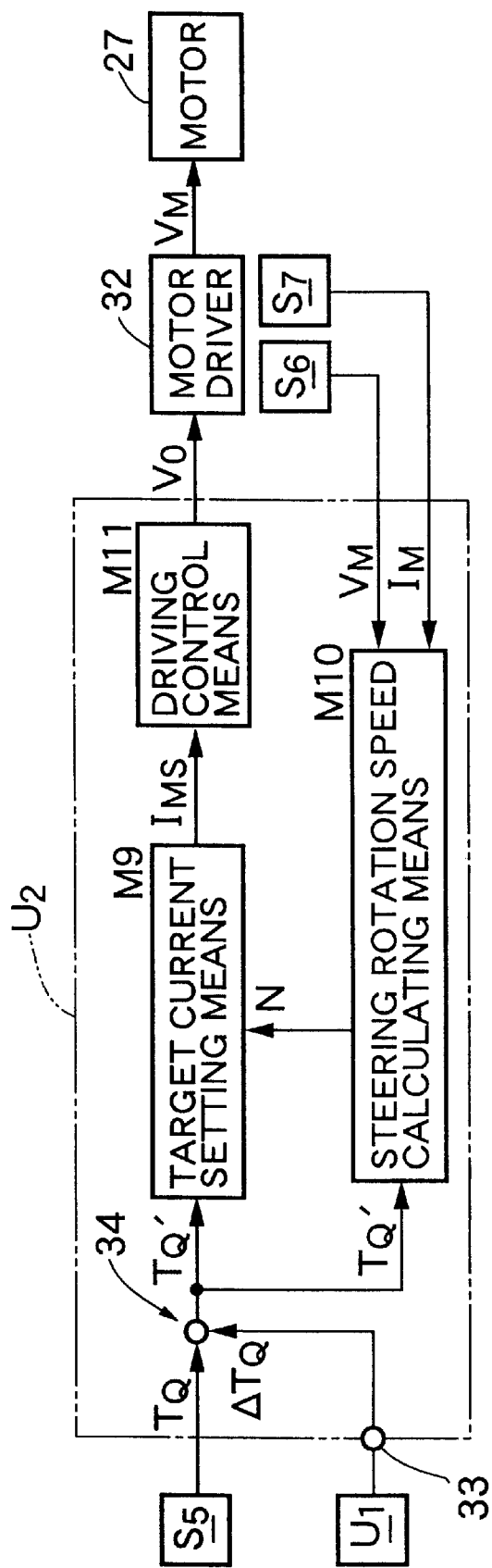
FIG. 9 is a diagram relating to a second embodiment of the present invention corresponding to the above-mentioned FIG. 6.

Next, a second embodiment of the present invention is explained by reference to FIG. 9.

In the above-mentioned first embodiment, the corrected steering torque $T_Q'$ calculated by the first electronic control unit $U_1$ is input into the second electronic control unit $U_2$, whereas in the second embodiment the first electronic control unit $U_1$ shares the calculation of the amount of steering torque correction $\Delta T_Q$. The corrected steering torque $T_Q'$ is calculated inside the second electronic control unit $U_2$ into which the amount of steering torque correction $\Delta T_Q$ is input by subjecting the steering torque $T_Q$ input from the steering torque detecting means $S_5$ and the amount of steering torque correction $\Delta T_Q$, to addition (or subtraction). The second electronic control unit $U_2$ controls the electric power steering device S based on the corrected steering torque $T_Q'$ so as to suppress the torque steer phenomenon in the same manner as in the first embodiment.

In accordance with the second embodiment, the second electronic control unit $U_2$ can be used for both a vehicle containing a driving force distribution device T and a vehicle not containing one merely by adding to the second electronic control unit $U_2$ a terminal 33, via which the amount of steering torque correction $\Delta T_Q$ is input from the first electronic control unit $U_1$, and an addition and subtraction means 34 which adds or subtracts the amount of steering torque correction $\Delta T_Q$ to or from the steering torque $T_Q$. Merely by making a slight change in the second electronic control unit $U_2$, its general applicability can be enhanced while suppressing an increase in cost as much as possible.

Next, a third embodiment of the present invention is explained by reference to FIG. 10 to FIG. 13.

Figure 10:
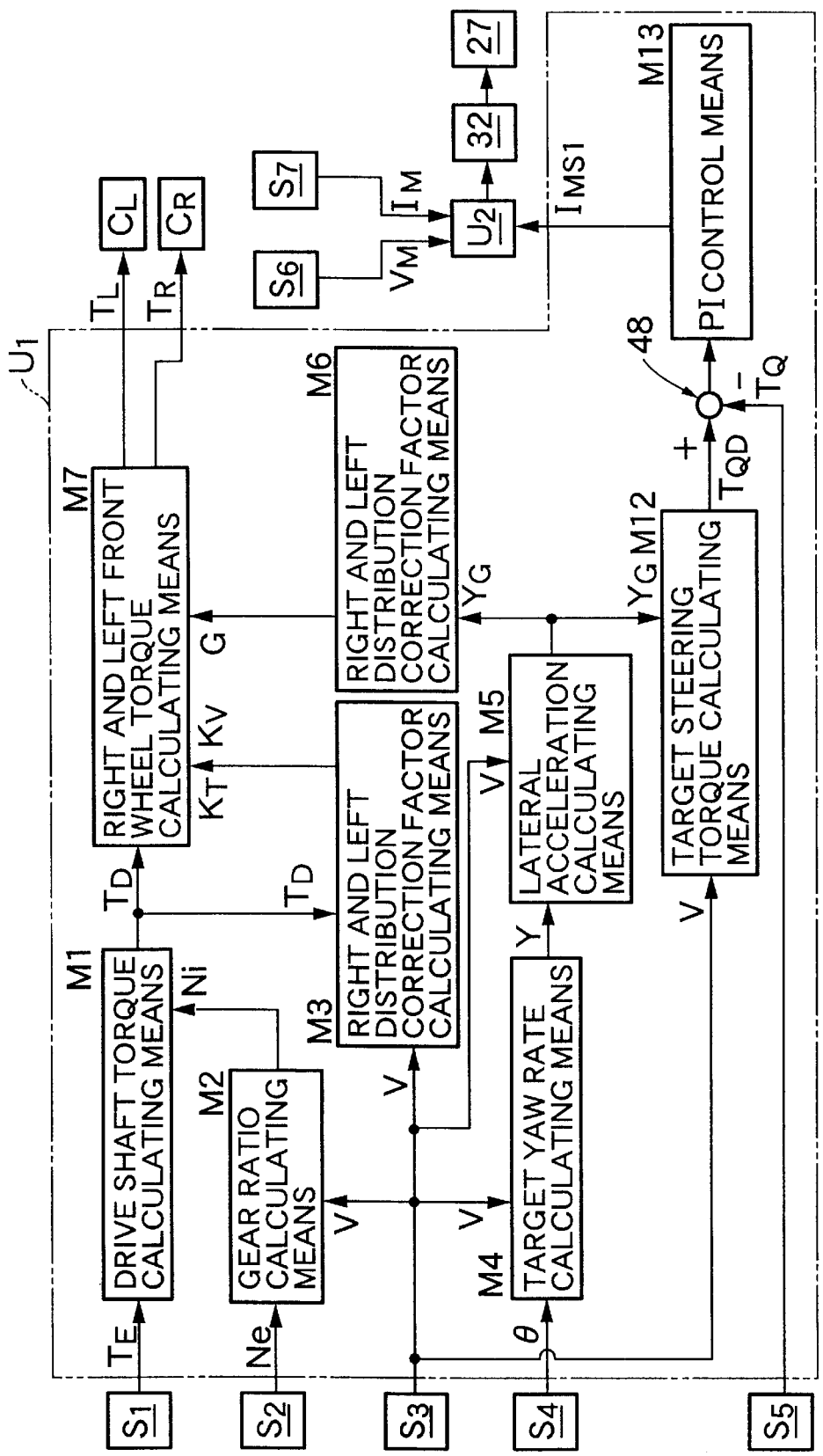
FIGS. 10 to 13 illustrate a third embodiment of the present invention.

As shown in FIG. 10, signals from an engine torque detecting means $S_1$ for detecting the engine torque $T_E$, an engine rotation rate detecting means $S_2$ for detecting the rotation rate Ne of the engine E, a vehicle speed detecting means S3 for detecting the vehicle speed V, a steering angle detecting means $S_4$ for detecting the steering angle θ and a steering torque detecting means $S_5$ for detecting the steering torque $T_Q$ are input into the first electronic control unit $U_1$.

The first electronic control unit $U_1$ processes the signals from the detecting means $S_1$ to $S_4$ based on a predetermined program, thus controlling the left hydraulic clutch $C_L$ and right hydraulic clutch $C_R$.

The first electronic control unit $U_1$ comprises a drive shaft torque calculating means M1, a gear ratio calculating means M2, a right and left distribution correction factor calculating means M3, a target yaw rate calculating means M4, a lateral acceleration calculating means M5, a right and left distribution correction factor calculating means M6, a front right and left wheel torque calculating means M7, a target steering torque calculating means M12 and a PI control means M13.

The configurations of the drive shaft torque calculating means M1, the gear ratio calculating means M2, the right and left distribution correction factor calculating means M3, the target yaw rate calculating means M4, the lateral acceleration calculating means M5, the right and left distribution correction factor calculating means M6 and the front right and left wheel torque calculating means M7 in the first electronic control unit $U_1$ are the same as those of the first embodiment. The first electronic control unit $U_1$ of the third embodiment does not contain a steering torque correction calculating means M8 as in the first electronic control unit $U_1$ of the first embodiment, but instead it contains a target steering torque calculating means M12 and a PI control means M13. The target steering torque calculating means M12 and the PI control means M13 are described in detail below.

When changes are made in the driving forces which are distributed to the front right and left wheels $W_{FR}$, $W_{FL}$ from the engine E via the driving force distribution device T, undesirable steering forces are produced in the front right and left wheels $W_{FR}$, $W_{FL}$, which are the steered wheels, due to the torque steer phenomenon. In a vehicle containing an electric power steering device S, when the torque steer phenomenon is caused due to operation of the driving force distribution device T, by operating the electric power steering device S so as to cancel the steering force due to the torque steer phenomenon and generate a steering assist torque in the opposite direction, the torque steer phenomenon can be suppressed.

Figure 13:
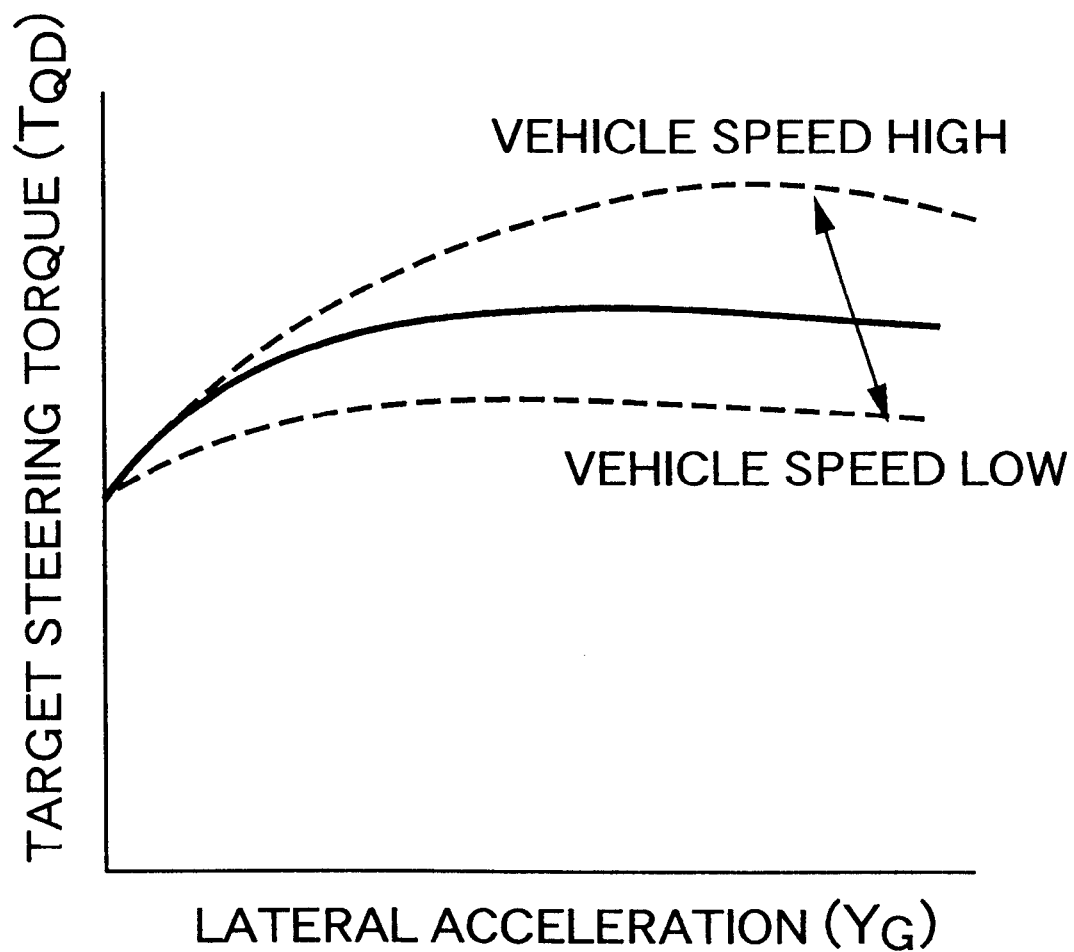

As is clear from FIG. 10, the target steering torque calculating means M12 searches for the target steering torque $T_{QD}$ from the map shown in FIG. 13 based on the lateral acceleration $Y_G$ calculated by the lateral acceleration calculating means M5 and the vehicle speed V detected by the vehicle speed detecting means $S_3$. This target steering torque $T_{QD}$ is a desirable characteristic of the steering torque $T_Q$ which depends basically on the level of the lateral acceleration $Y_G$ in the case where the torque steer phenomenon is not caused and is also set so as to change according to the level of the vehicle speed V.

A subtracting means 48, into which the target steering torque $T_{QD}$ calculated by the target steering torque calculating means M12 and the steering torque $T_Q$ detected by the steering torque detecting means $S_5$ have been input, calculates the deviation $T_{QD}-T_Q$ between the two and outputs it to the PI control means M13. In order for the deviateion $T_{QD}-T_Q$ to converge to zero by operating the electronic power steering device S, the PI control means M13 outputs a first target current $I_{MS1}$ for driving the motor 27 of the electronic power steering device S, to the second electronic control unit $U_2$. This first target current $I_{MS1}$ corresponds to the torque steer prevention control signal of the present invention and represents the current from which the electric power steering device S generates the steering torque that can cancel the steering torque caused by the torque steer phenomenon.

The second electronic control unit $U_2$ which forms the second control means of the present invention does not control operation of the electric power steering device S by itself, but co-operatively controls operation of the electric power steering device S in conjunction with operation of the driving force distribution device T.

Figure 11:
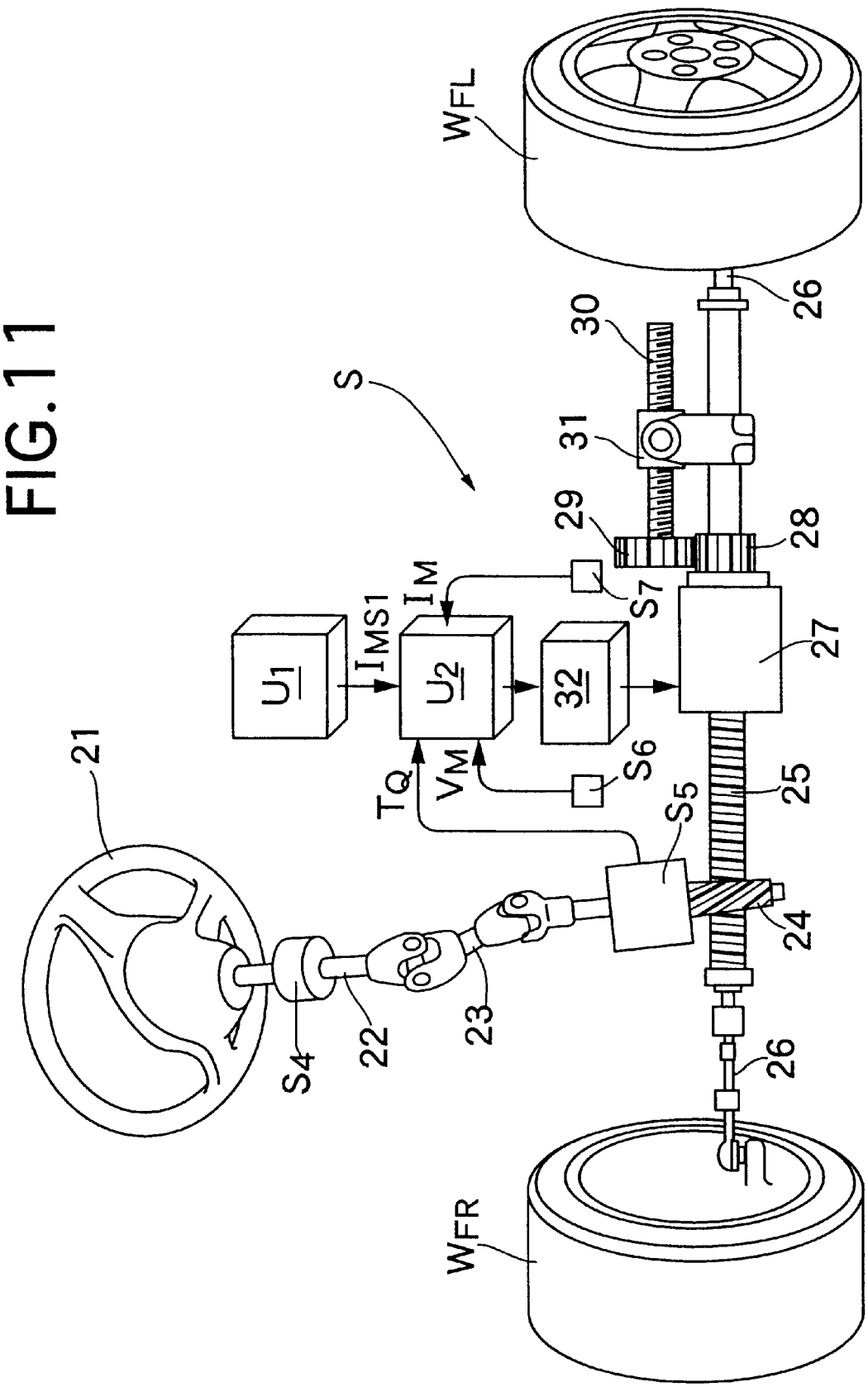
Figure 12:
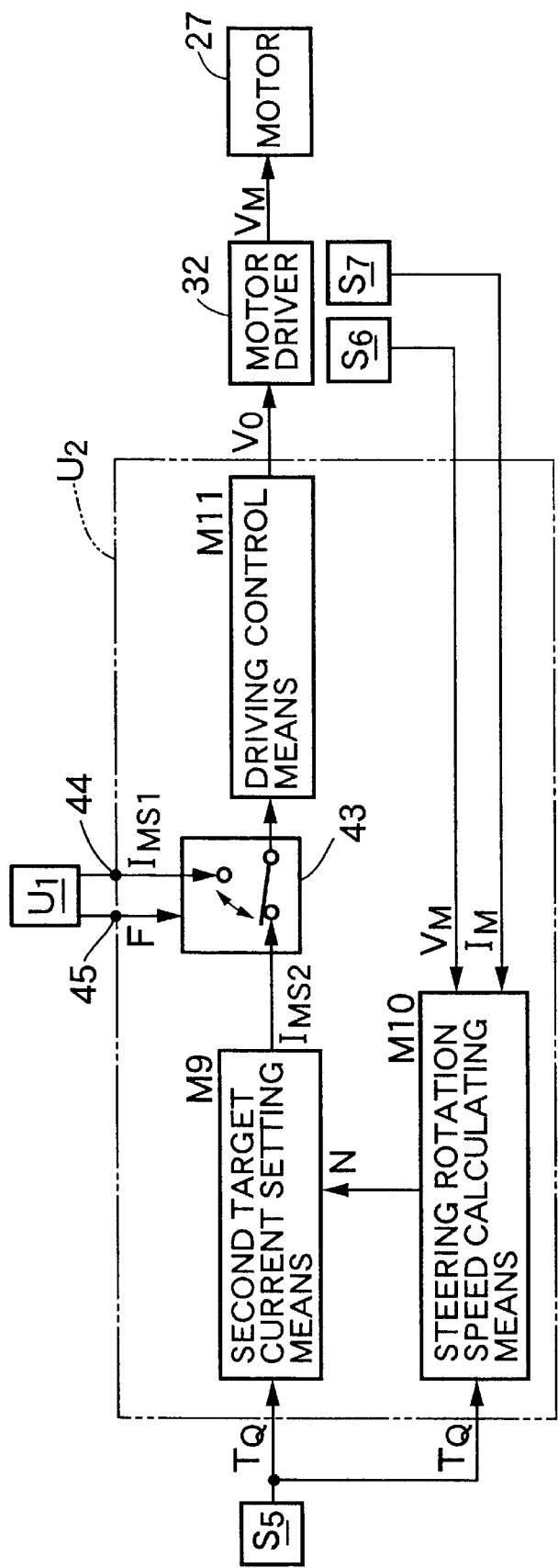

As shown in FIG. 11 and FIG. 12, the second electronic control unit $U_2$ comprises a second target current setting means M9, a steering rotation speed calculating means M10, a driving control means M11 and a switch over means 43.

The second target current setting means M9 calculates the second target current $I_{MS2}$ for driving the motor 27 based on the steering torque $T_Q$ which is input from the steering torque detecting means $S_5$ and the steering rotation speed N which is input from the steering rotation speed calculating means M10. Although the steering rotation speed N is the rotation speed of the steering wheel 21 (that is to say, the rotation speed of pinion 24) and can also be detected by a rotation speed detecting means such as a tachometer, in the present embodiment it is calculated based on the voltage $V_M$ of the motor 27 detected by the voltage detecting means $S_6$, the current $I_M$ of the motor 27 detected by the current detecting means $S_7$ and the steering torque $T_Q$ which is input from the steering torque detecting means $S_5$.

The second target current $I_{MS2}$ corresponds to the steering assist control signal of the present invention and increases linearly according to increases in the steering torque $T_Q$ when the steering torque $T_Q$ is at a predetermined level or less, but when the steering torque $T_Q$ exceeds the predetermined level, the smaller the steering rotation speed N, the more the upper limit of the second target current $I_{MS2}$ is suppressed. Due to the characteristics of the second target current $I_{MS2}$, when the driver turns the steering wheel 21 to a limit position, making it reach the end of the rack, that is to say, when the steering torque $T_Q$ becomes large and the steering rotation speed N becomes small, it is possible to prevent the motor 27 from being driven by a large second target current $I_{MS2}$ which results in an overloaded state.

The first target current $I_{MS1}$ from the first electronic control unit $U_1$ and the second target current $I_{MS2}$ from the second target current setting means M9 are input into the switch over means 43, which outputs either one of the first target current $I_{MS1}$ or the second target current $I_{MS2}$ to the driving control means M11 according to a driving force distribution device operation flag F that is input from the first electronic control unit $U_1$. The driving force distribution device operation flag F is set at '1' when the driving force distribution device T is being operated (when $|T_L-T_R|$ is a predetermined value or greater), and is reset to '0' when the driving force distribution device T is not being operated (when $|T_L-T_R|$ is less than the predetermined value). When the flag is set at '1' and the driving force distribution device T is being operated, the first target current $I_{MS1}$ from the first electronic control unit $U_1$ is output to the driving control means M11, whereas when the flag is reset to '0' and the driving force distribution device T is not being operated, the second target current $I_{MS2}$ from the second target current setting means M9 is output to the driving control means M11.

The driving control means M11 calculates the motor control voltage $V_0$ by converting the first target current $I_{MS1}$ or the second target current $I_{MS2}$ into a PWM control signal, a motor driver 32 subjects the motor driving voltage $V_M$ to PWM control based on the motor control voltage $V_0$, and thus the motor 27 of the electric power steering device S is driven so as to generate the torque steer prevention torque or the steering assist torque. By so doing, when the driving force distribution device T is not being operated, steering operation by the driver is assisted by generating ordinary steering assist torque in the electric power steering device S, and when the driving force distribution device T is being operated and the torque steer phenomenon is caused, the torque steer phenomenon can be suppressed by generating a torque steer prevention torque in the electric power steering device S.

As hereinbefore described, since the first target current $I_{MS1}$ for generating the torque steer prevention torque in the electric power steering device S is calculated inside the first electronic control unit $U_1$ for controlling the operation of the driving force distribution device T, it is not necessary to calculate the first target current $I_{MS1}$ inside the second electronic control unit $U_2$ for controlling operation of the electric power steering device S. Thus by introducing only a minimal change (that is to say, the switch over means 43 and two terminals 44, 45 for inputting the first target current $I_{MS1}$ and the flag F) to the second electronic control unit $U_2$ of the electric power steering device S which does not carry out co-operative control with the driving force distribution device T, the torque steer phenomenon can be suppressed. As a result, by installing a second electronic control unit $U_2$ of the same specification as that shown in FIG. 12, to a vehicle containing the driving force distribution device T and a vehicle that does not contain it, it is possible to carry out control so as to suppress the torque steer phenomenon in a vehicle comprising the driving force distribution device T without problems, thereby reducing the number of variants of the second electronic control unit $U_2$ and contributing to a reduction in cost.

Figure 14:
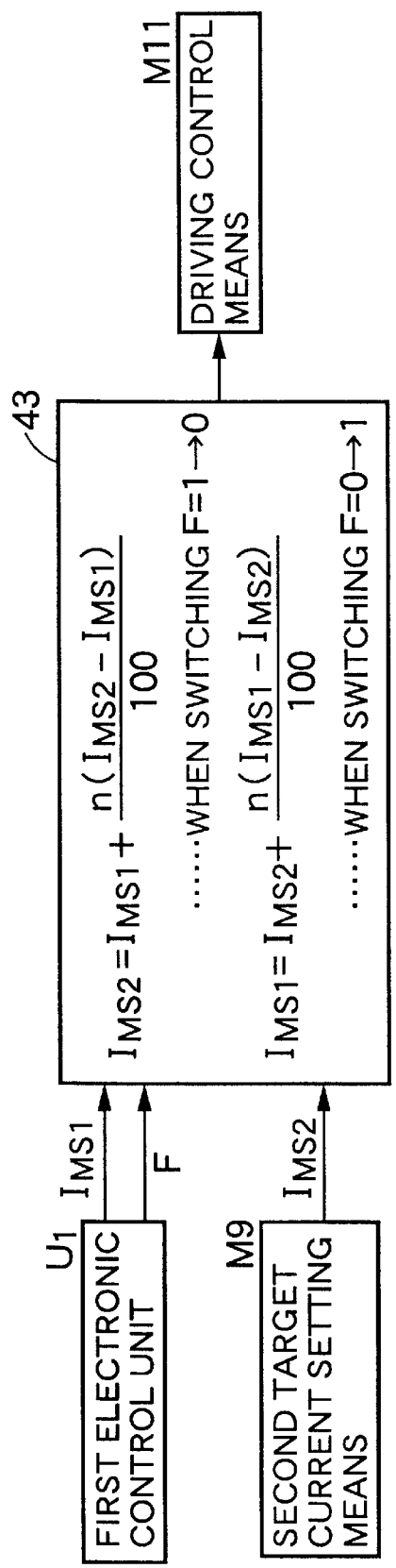
FIG. 14 is a diagram for explaining the function of the switch over means relating to a fourth embodiment of the present invention.

Next, a fourth embodiment of the present invention is explained by reference to FIG. 14.

In the above-mentioned third embodiment, the switch over means 43 switches between the first target current $I_{MS1}$ and the second target current $I_{MS2}$ according to the operation and non-operation of the driving force distribution device T. If the switch over is carried out rapidly when there is a large difference between the first target current $I_{MS}$, and the second target current $I_{MS2}$, the steering assist torque generated by the electric power steering device S changes rapidly and there is thus a possibility of the driver experiencing an unpleasant sensation. Therefore, in the present fourth embodiment, when the switch over means 43 switches between the first target current $I_{MS1}$ and the second target current $I_{MS2}$, the switch over from the first target current $I_{MS1}$ to the second target current $I_{MS2}$ or the switch over from the second target current $I_{MS2}$ to the first target current $I_{MS1}$, is carried out gradually.

That is to say, when the driving force distribution device T changes from an operational mode to a non-operational mode and the switch over from the first target current $I_{MS1}$ to the second target current $I_{MS2}$ is carried out, the second target current $I_{MS2}$ is calculated using the equation below;

$$I_{MS2}=I_{MS1}+(I_{MS2}-I_{MS1})\times(n/100) \tag{6}$$

and when the driving force distribution device T changes from a non-operational mode to an operational mode and the switch over from the second target current $I_{MS2}$ to the first target current $I_{MS1}$ is carried out, the first target current $I_{MS1}$ is calculated using the equation below.

$$I_{MS1}=I_{MS2}+(I_{MS1}-I_{MS2})\times(n/100) \tag{7}$$

In the equations, n is the number of loops over which the control program is executed and it is incremented at each loop from 0 to 100. Thus, the switch over between the first target current $I_{MS1}$ and the second target current $I_{MS2}$ is carried out gradually while the loop is repeated 100 times, and rapid changes in the steering assist torque generated by the electric power steering device S so causing the driver to experience an unpleasant sensation, can be prevented.

Figure 15:
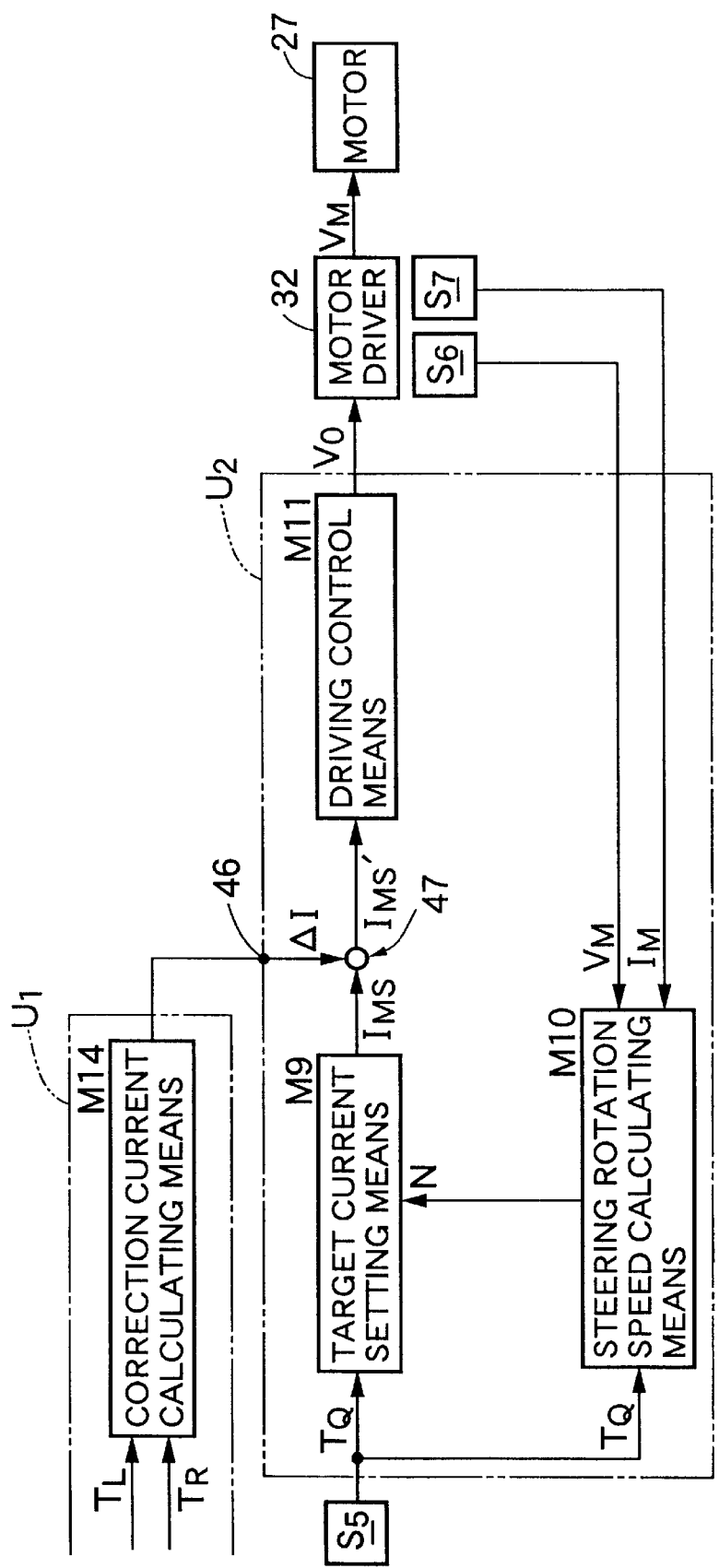
FIG. 15 is a diagram relating to a fifth embodiment of the present invention corresponding to the above-mentioned FIG. 12.

Next, a fifth embodiment of the present invention is explained by reference to FIG. 15.

In the above-mentioned third and fourth embodiments, the first target current $I_{MS1}$ calculated by the first electronic control unit $U_1$ is input into the second electronic control unit $U_2$, but in the fifth embodiment, the first electronic control unit $U_1$ shares calculation of the amount of current correction $\Delta I$ with the correction current calculating means M14, and the corrected target current $I_{MS}'$ is calculated inside the second electronic control unit $U_2$, into which the amount of current correction $\Delta I$ is input, by subjecting the target current $I_{MS}$ calculated in the second electronic control unit $U_2$ and the amount of current correction $\Delta I$ to addition (or subtraction). The amount of current correction $\Delta I$ is the amount obtained by converting the amount of torque that is to be generated by the motor 27 in order to prevent the torque steer phenomenon into a target current. The target current $I_{MS}$ corresponds to the motor control signal of the present invention and the amount of current correction $\Delta I$ corresponds to the correction signal of the present invention.

Thus, due to the control of the electric power steering device S by the second electronic control unit $U_2$ based on the corrected target current $I_{MS}'$, it is possible to carry out assistance of the steering operation by the driver which is the essential function of the electric power steering device S and suppression of the torque steer phenomenon at the same time. In the case where the steering force is produced by operation of the driving force distribution device T in the same direction as that of the steering operation by the driver, the torque steer phenomenon accompanying the operation of the driving force distribution device T can be suppressed by subtracting the amount of current correction $\Delta I$ from the target current $I_{MS}$ to give the corrected target current $I_{MS}'$, and in the case where the steering force is produced in the direction opposite to that of the steering operation by the driver, it can be suppressed by adding the amount of current correction $\Delta I$ to the target current $I_{MS}$ to give the corrected target current $I_{MS}'$.

In accordance with the fifth embodiment, merely by adding a terminal 46 via which the amount of current correction $\Delta I$ is input from the first electronic control unit $U_1$ and an addition and subtraction means 47 which adds or subtracts the amount of current correction $\Delta I$ to or from the target current $I_{MS}$ to the second electronic control unit $U_2$, the second electronic control unit $U_2$ can be applied to both a vehicle containing the driving force distribution device T and a vehicle that does not contain it, and merely by adding a slight change to the second electronic control unit $U_2$ its general applicability can be enhanced while minimizing the increase in cost.

The driving force distribution device of the present invention is not limited to one which distributes the driving force between the right and left wheels, and it may be one which distributes the driving force between the front and rear wheels. Furthermore, the present invention can also be applied to the case where the braking force is distributed between the right and left wheels or the front and rear wheels.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A vehicle co-operative control device comprising:
    a driving force and/or braking force distribution device for distributing the driving force or braking force between a pair of wheels of the vehicle;
    a first control means for controlling the operation of the driving force and/or braking force distribution device;
    an electric power steering device for applying a steering assist torque to a steering system;
    a steering torque detecting means; and
    a second control means for controlling the operation of the electric power steering device based on at least the steering torque detected by the steering torque detecting means,
    wherein the steering torque detected by the steering torque detecting means is input into the first control means and the first control means calculates a corrected steering torque by correcting said steering torque according to the degree of control of the driving force and/or braking force distribution device and outputs the corrected steering torque to the second control means, and
    wherein the second control means calculates the steering assist torque based on the corrected steering torque.

2. The vehicle co-operative control device according to claim 1, wherein the first control means is structurally and physically separate from the second control means.

3. A vehicle co-operative control device comprising:
    a driving force and/or braking force distribution device for distributing the driving force or braking force between a pair of wheels of the vehicle;
    a first control means for controlling the operation of the driving force and/or braking force distribution device;
    an electric power steering device for applying a steering assist torque to a steering system;
    a steering torque detecting means; and
    a second control means for controlling the operation of the electric power steering device based on at least the steering torque detected by the steering torque detecting means,
    wherein the first control means calculates an amount of steering torque correction according to the degree of control of the driving force and/or braking force distribution device and outputs it to the second control means, and the second control means calculates the steering assist torque based on a value obtained by adding or subtracting the amount of steering torque correction to or from the steering torque detected by the steering torque detecting means.

4. The vehicle co-operative control device according to claim 3, wherein the first control means is structurally and physically separate from the second control means.

5. A vehicle co-operative control device comprising a driving force and/or braking force distribution device for distributing the driving force or braking force between a pair of wheels of the vehicle, a first control means for controlling the operation of the driving force and/or braking force distribution device, an electric power steering device having a motor for applying a steering assist torque to a steering system, a steering torque detecting means, and a second control means for calculating a steering assist control signal for driving the motor based on at least the steering torque detected by the steering torque detecting means, wherein the first control means calculates a torque steer prevention control signal for driving the motor based on the degree of control of the driving force and/or braking force distribution device, and wherein the second control means comprises a switch over means for providing an output to the electric power steering device by selecting one of the steering assist control signal and the torque steer prevention control signal according to the operational status of the driving force and/or braking force distribution device.

6. A vehicle co-operative control device according to claim 5 wherein said switch over means gradually carries out the switching over between the steering assist control signal and the torque steer prevention control signal.

7. The vehicle co-operative control device according to claim 5, wherein the first control means is structurally and physically separate from the second control means.

8. A vehicle co-operative control device comprising:

a driving force and/or braking force distribution device for distributing the driving force or braking force between a pair of wheels of the vehicle;

a first control means for controlling the operation of the driving force and/or braking force distribution device;

an electric power steering device having a motor for applying a steering assist torque to a steering system;

a steering torque detecting means; and a second control means for calculating a motor control signal for driving the motor based on at least the steering torque detected by the steering torque detecting means, wherein the first control means calculates a correction signal for correcting the motor control signal based on the degree of control of the driving force and/or braking force distribution device, and wherein the second control means comprises an addition and subtraction means which adds or subtracts the correction signal to or from the motor control signal.

9. The vehicle co-operative control device according to claim 8, wherein the first control means is structurally and physically separate from the second control means.

* * * * *